United States Patent
Sharshevsky et al.

(10) Patent No.: US 11,055,365 B2
(45) Date of Patent: Jul. 6, 2021

(54) MECHANISM FOR WEB CRAWLING E-COMMERCE RESOURCE PAGES

(71) Applicant: PAYPAL, INC., San Jose, CA (US)

(72) Inventors: Olga Sharshevsky, Tel Aviv (IL); Nadav Weissman, Tel Aviv (IL); Ran Yuchtman, Holon (IL); Smadar Gazit, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 169 days.

(21) Appl. No.: 16/023,616

(22) Filed: Jun. 29, 2018

(65) Prior Publication Data

US 2020/0004880 A1 Jan. 2, 2020

(51) Int. Cl.
*G06F 16/951* (2019.01)
*G06Q 30/06* (2012.01)

(52) U.S. Cl.
CPC ....... *G06F 16/951* (2019.01); *G06Q 30/0623* (2013.01); *G06Q 30/0633* (2013.01)

(58) Field of Classification Search
None
See application file for complete search history.

(56) References Cited

U.S. PATENT DOCUMENTS

| | | | |
|---|---|---|---|
| 6,145,003 A | 11/2000 | Sanu et al. | |
| 6,418,452 B1 | 7/2002 | Kraft et al. | |
| 7,328,401 B2 | 2/2008 | Obata et al. | |
| 9,697,551 B1* | 7/2017 | Bilger | G06Q 30/0609 |
| 2002/0052928 A1* | 5/2002 | Stern | G06F 16/9535 709/218 |
| 2004/0019670 A1* | 1/2004 | Viswanath | H04L 41/0856 709/223 |
| 2007/0174143 A1 | 7/2007 | Smilowitz et al. | |
| 2012/0310914 A1 | 12/2012 | Khan | |
| 2013/0262618 A1* | 10/2013 | Khan | G06Q 30/06 709/217 |
| 2016/0110455 A1* | 4/2016 | von Bochmann | G06F 16/80 707/709 |
| 2017/0109767 A1 | 4/2017 | Shpanya et al. | |
| 2019/0007506 A1* | 1/2019 | Xu | G06F 16/24578 |

FOREIGN PATENT DOCUMENTS

WO WO 2016/177646 11/2016

* cited by examiner

*Primary Examiner* — Giuseppi Giuliani
(74) *Attorney, Agent, or Firm* — Haynes and Boone, LLP

(57) ABSTRACT

A computer system identifies a platform that corresponds to a first resource, wherein the first resource includes one or more resource pages. The computer system determines one or more x-paths that corresponds to the identified platform. The computer system utilizes at least a first x-path of the one or more x-paths to add a product to a digital shopping cart associated with the first resource. In response to adding the product to the digital shopping cart associated with the first resource, the computer system utilizes at least a second x-path of the one or more x-paths to access a first resource page of the one or more resource pages, wherein the first resource page is a checkout page. The computer system determines whether one or more elements located within the first resource page are valid.

20 Claims, 6 Drawing Sheets

MECHANISM FOR WEB CRAWLING E-COMMERCE RESOURCE PAGES

TECHNICAL FIELD

The present disclosure relates to e-commerce resource pages, and more particularly to a more effective way to web crawl e-commerce resource pages.

BACKGROUND

A web crawler is an extremely useful tool for certain tasks such as web indexing, and updating web content. Web crawlers typically starts with a lists of uniform resource locators (URLs) to visit, which may sometimes be referred to as "seeds". As the web crawler visits these URLs, it identifies all the hyperlinks in the page and adds them to the list of URLs to visit, storing the list in a data structure referred to as the "crawl frontier". However, one major drawback of using web crawlers is that access to certain e-commerce webpages, such as checkout pages may not be easily accessible because in order to access a checkout page, an associated shopping cart typically must have an item, such as a product, in it. It would be advantageous to have a mechanism that allows a web crawler to access all pages of e-commerce websites.

DETAILED DESCRIPTION

Embodiments of the present disclosure provide a system, method, and program product. A computer system identifies a platform that corresponds to a first resource, wherein the first resource includes one or more resource pages. The computer system determines one or more x-paths that corresponds to the identified platform. The computer system utilizes at least a first x-path of the one or more x-paths to add a product to a digital shopping cart associated with the first resource. In response to adding the product to the digital shopping cart associated with the first resource, the computer system utilizes at least a second x-path of the one or more x-paths to access a first resource page of the one or more resource pages, wherein the first resource page is a checkout page. The computer system determines whether one or more elements located within the first resource page are valid.

In the example embodiment, the present disclosure describes a solution that describes identifying a platform (such as "Shopify", Shopify is a registered trademark of Shopify, Inc.) corresponding to a website, and further identifying one or more x-paths that correspond to the platform. In the example embodiment, the present disclosure further describes utilizing a set of x-paths which may include an x-path corresponding to a product listing page, an x-path corresponding to a product page, an x-path corresponding to the "add to cart" button, and an x-path corresponding to a checkout page, in order to validate one or more elements on a website (such as advertisements, banners, user interface elements, etc.). As stated above, currently, a web crawler may not be able to access a checkout page due to a checkout page only being accessible once an item, such as a product, has been added to a digital shopping cart. The present disclosure describes a solution to this problem by describing an automated system where a web crawler may be capable of identifying a set of x-paths which may be utilized to automatically add a product to a digital shopping cart and then further access a checkout page so that one or more elements on the checkout page can be checked for validity.

Furthermore, in further embodiments, the present disclosure describes a solution for performing a similar process for an application.

Embodiments of the present disclosure will now be described in detail with reference to the accompanying Figures.

Figure 1:
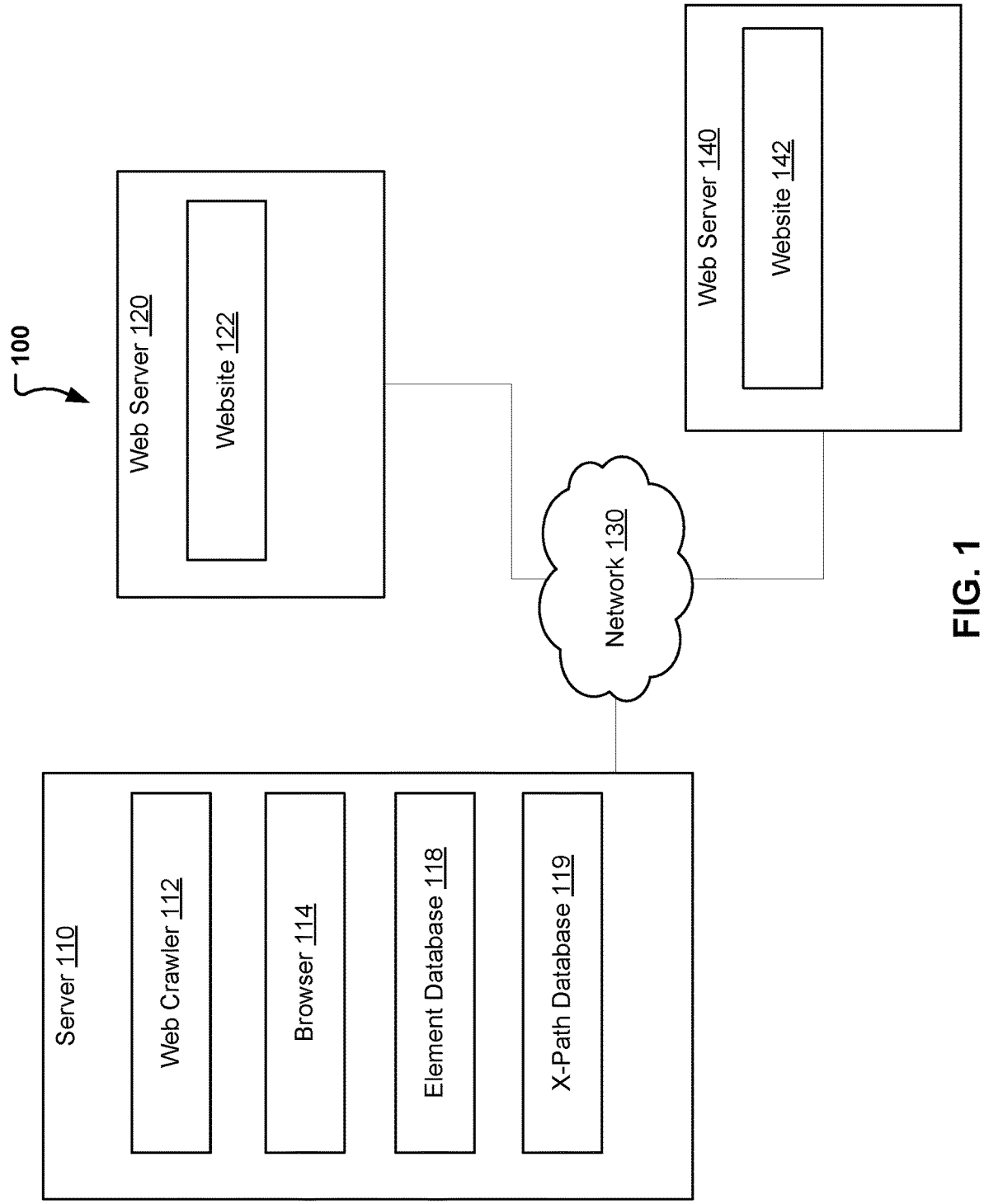
FIG. 1 illustrates a web crawler system, in accordance with an embodiment.

FIG. 1 illustrates web crawler system 100, in accordance with an embodiment. In the example embodiment, web crawler system 100 includes server 110, web server 120, and web server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between server 110 and web server 140.

In the example embodiment, web server 120 includes website 122. In the example embodiment, web server 120 may be a desktop computer, a laptop computer, a tablet computer, a mobile device, a handheld device, a thin client, or any other electronic device or computing system capable of receiving and sending data to and from other computing devices, such as server 110, via network 130. Although not shown, optionally, web server 120 can comprise a cluster of servers executing the same software to collectively process requests as distributed by a front-end server and a load balancer. In the example embodiment, web server 120 is a computing device that is optimized for the support of websites that reside on web server 120, such as website 122, and for the support of network requests related to websites, which reside on web server 120. Web Server 120 is described in more detail with regard to the figures.

In the example embodiment, website 122 is a collection of files including, for example, HTML files, CSS files, image files and JavaScript files. Website 122 may also include other resource files such as audio files and video files. Website 122 is described in more detail with regard to the figures.

In the example embodiment, web server 140 includes website 142. In the example embodiment, web server 140 may be a desktop computer, a laptop computer, a tablet computer, a mobile device, a handheld device, a thin client, or any other electronic device or computing system capable of receiving and sending data to and from other computing devices, such as server 110, via network 130. Furthermore, in the example embodiment, web server 140 is a computing device that is optimized for the support of websites that reside on web server 140, such as website 142, and for the support of network requests related to websites, which reside on webs server 140. Although not shown, optionally, web server 140 can comprise a cluster of servers executing the same software to collectively process requests as distributed by a front-end server and a load balancer. Web server 140 is described in more detail with regard to figures.

In the example embodiment, website 142 is a collection of files including, for example, HTML files, CSS files, image files and JavaScript files. Website 142 may also include other resources such as audio files and video files. Website 142 is described in more detail with regard to the figures.

In the example embodiment, server 110 includes web crawler 112, browser 114, element database 118, and x-path database 119. In the example embodiment, server 110 may be a desktop computer, a laptop computer, a tablet computer, a mobile device, a handheld device, a thin client, or any other electronic device or computing system capable of receiving and sending data to and from other computing devices, such as web server 120, via network 130. Furthermore, in the example embodiment, server 110 is a computing device that is optimized for the support of programs and databases that reside on server 110, such as web crawler 112 and element database 118. Although not shown, optionally, server 110 can comprise a cluster of servers executing the same software to collectively process requests as distributed by a front-end server and a load balancer. Server 110 is described in more detail with regard to figures.

In the example embodiment, browser 114 is an application that is capable of communicating with other computing devices to transmit request and a receive information. Furthermore, browser 114 is capable of displaying received information to the user of server 110. In the example embodiment, browser 114 may transmit a request to website 142, and further receive webpage information from website 142. Furthermore, in one or more embodiments, web crawler 112 may utilize the functionality of browser 114 to access one or more websites, such as website 122 and/or website 142. Browser 114 is described in further detail with regard to the figures.

In the example embodiment, element database 118 is a database that includes a listing of websites that correspond to one or more elements of an entity (or more than one entity), such as a banner ad for a specific company. Furthermore, database 118 may additionally denote the elements, and element location within each specific website. For example, database 118 may include a listing of websites that are known to have a banner advertisement that corresponds to a financial company. Furthermore, database 118 may include information identifying the last time/date that each of the banner advertisements were checked for validity, and further a last known status (valid, needs updating, etc.). In addition, element database 118 may include a list of currently valid elements that correspond with entity or group of entities.

In the example embodiment, x-path database 119 includes information that includes one or more platforms and one or more x-paths that correspond to each of the one or more platforms. Furthermore, in the example embodiment, the one or more platforms may include a platform, such as Shopify (Shopify® is a trademark of Shopify, Inc.), that may be utilized in creating a website, such as an e-commerce website. For example, a first platform may correspond to a first set of x-paths for accessing a page associated with listing of products, a second set of x-paths for accessing a product page, a third set of x-paths for adding a product to a digital shopping cart, and fourth set of x-path for accessing a checkout page. In the example embodiment, web crawler 112 may access x-path database 119 to identify the x-path(s) that correspond to a specific platform associated with a website that is being analyzed. Element database 118 and x-path database 119 are described in further detail with regard to the figures.

Web crawler 112 is a software application that is capable of browsing the internet in order to, in the example embodiment; validate one or more elements present in websites. In the example embodiment, web crawler 112 is capable of accessing element database 118 to identify one or more websites that need to be analyzed. Furthermore, in the example embodiment, web crawler 112 is capable of identifying a platform associated with a website being analyzed. In addition, web crawler 112 is capable of accessing x-path database 119 to identify one or more x-paths associated with adding an item, such as a product, to a shopping cart, and further, accessing a checkout page of a website. Additionally, in the example embodiment, web crawler 112 is capable of analyzing an element on a website to identify if the element is valid (or needs to be updated). Web crawler 112 is described in further detail with regard to the figures.

Furthermore, in one or more embodiments, web crawler 112 may utilize an application programming interface (API) in communicating with browser 114, and further in communicating with database 118.

Figure 2:
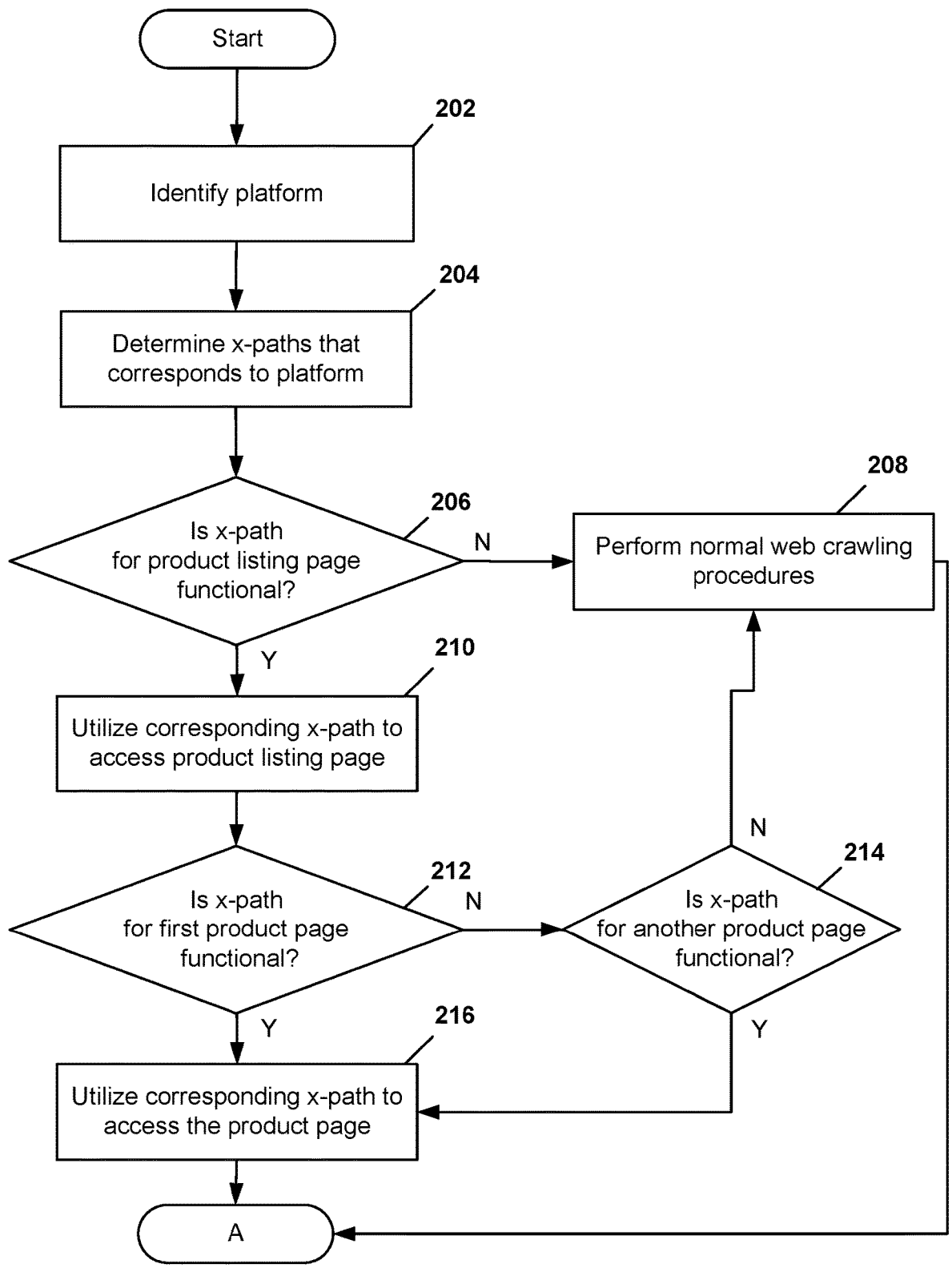
FIGS. 2, 3, and 4 are a flowchart illustrating the operations of the web crawler program of FIG. 1 in identifying one or more x-paths that correspond to a platform, and further utilizing the one or more x-paths to access a checkout page and determine if one or more elements on the checkout page need to be updated, in accordance with an embodiment.
Figure 3:
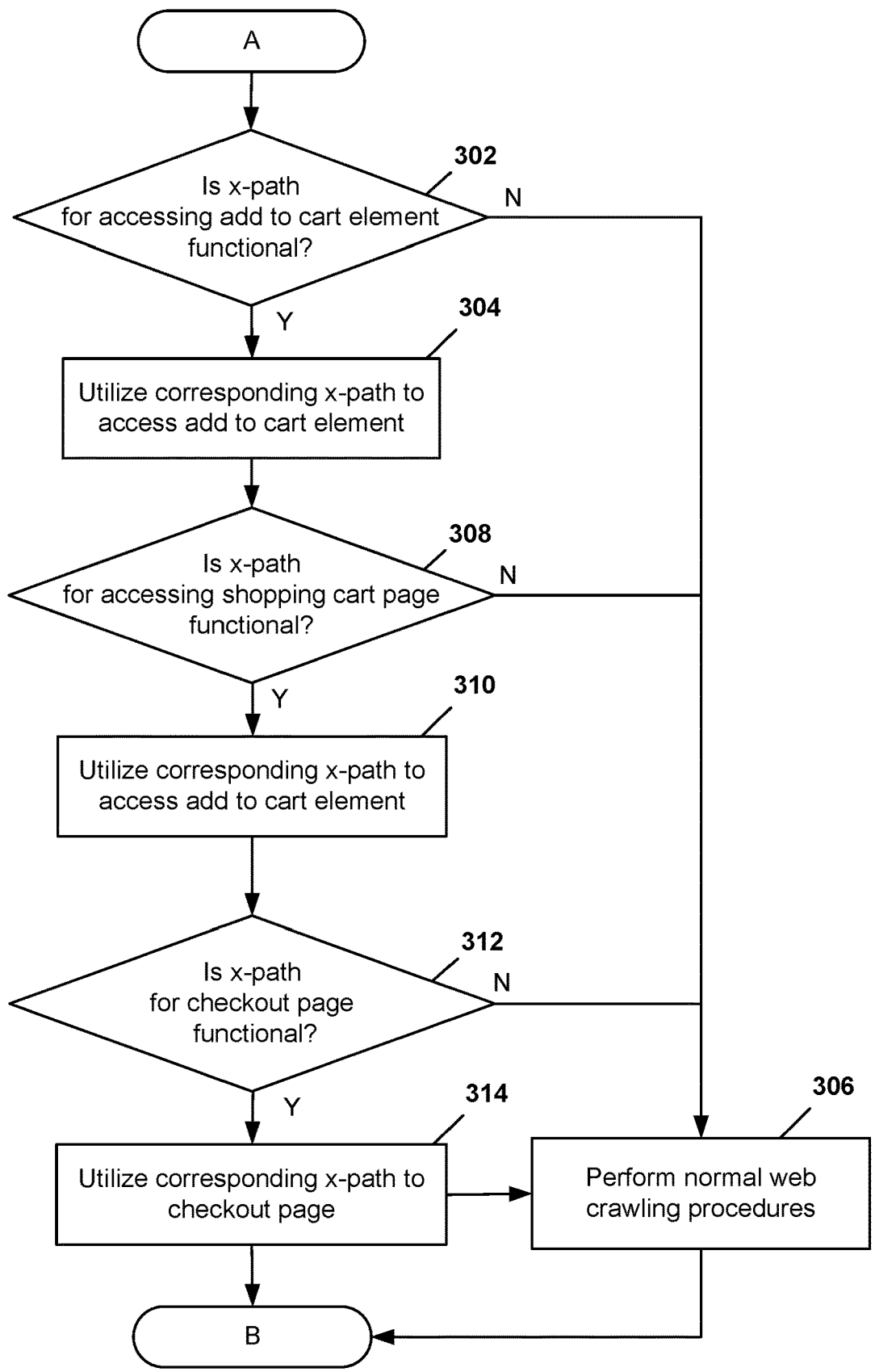
Figure 4:
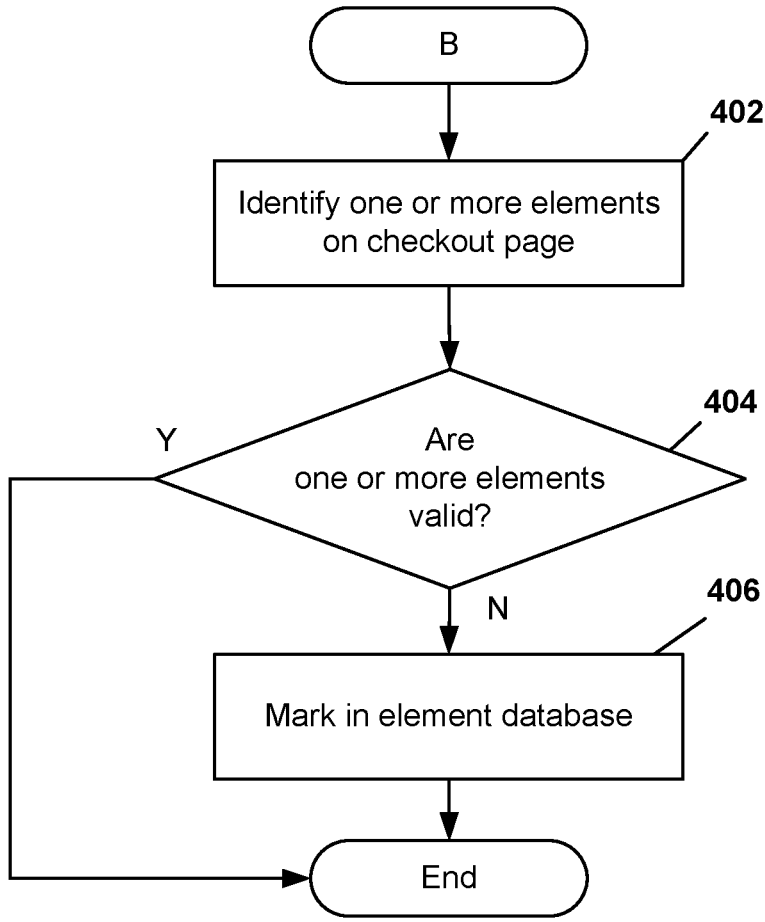

FIGS. 2 through 4 are a flowchart illustrating the operations of the web crawler 112 in identifying one or more x-paths that correspond to a platform, and further utilizing the one or more x-paths to access a checkout page and determine if one or more elements on the checkout page need to be updated, in accordance with an embodiment. In the example embodiment, web crawler 112 identifies the platform corresponding to a website to be analyzed, such as website 122 or website 142 (step 202). In the example embodiment, web crawler 112 identifies the platform that corresponds to a website to be analyzed by communicating with a technology profiler application, such as BuiltWith (BuiltWith® is registered trademark of BuiltWith Inc.). In other embodiments, web crawler 112 may have the capability to search for special tech signatures and HTML tags within the source code associated with a website, and further may reference a database that includes one or more platforms and corresponding special tech signatures/HTML tags, in order to identify the platform associated with the website.

In the example embodiment, web crawler 112 determines one or more x-paths that correspond to the identified platform (step 204). In the example embodiment, web crawler 112 accesses x-path database 119 and identifies one or more x-paths that correspond to the platform. In the example embodiment, the one or more x-paths may include an x-path(s) associated with accessing a product listing page, an x-path(s) associated with accessing a product page, an x-path associated with accessing an add to cart element, and an x-path associated with accessing a checkout page.

Web crawler 112 determines if an x-path(s) associated with (accessing) a product listing page is functional (decision 206). In the example embodiment, one or more x-paths may be associated with accessing the product listing page. Therefore, in the example embodiment, web crawler 112 may attempt to utilize a first x-path (obtained from x-path database 119) of the one or more x-paths associated with the product listing page to access the product listing page, and if the page is not successfully accessed, web crawler 112 determines the first x-path is not functional (web crawler 112 may then update x-path database 120 to indicate that the first x-path is not functional). Furthermore, in the example embodiment, if there is more than one x-path associated with the product listing page, web crawler 112 may then attempt to access the product listing page utilizing a second x-path of the one or more x-paths associated with the product listing page to determine if the second x-path is functional. If the second x-path is not functional, web crawler 112 may determine if the other x-paths associated with accessing the product listing are functional (in a similar manner as described above), until a functional x-path is identified or until all the x-paths have been tested. If at least one of the one or more x-paths can be utilized to access the product listing page, web crawler 112 determines that the x-path(s) associated with the product listing page is functional. If at least one of the one or more x-paths are not able to be utilized to access the product listing page, web crawler 112 determines that the x-path(s) associated with the product listing page is not functional.

If web crawler 112 determines that the x-path(s) associated with the product listing page is not functional (decision 206, "NO" branch), web crawler 112 performs normal web crawling procedures (step 208). In the example embodiment, normal web crawling procedures may include indexing, and validation of interface elements on pages that are accessible to web crawler 112.

If web crawler 112 determines that the x-path(s) associated with the product listing page is functional (decision 206, "YES" branch), web crawler 112 utilizes the x-path to access the product listing page (step 210).

Web crawler 112 determines if an x-path(s) associated with (accessing) a first product page is functional (decision 212). In the example embodiment, the product listing page may include one or more interface elements corresponding to one or more products. Web crawler 112 may attempt to utilize an x-path (obtained from x-path database 119) associated with a page of the first product on the product listing page to access the page associated with the first product, and if the page is not successfully accessed, web crawler 112 determines the x-path associated with the first product page is not functional (web crawler 112 may then update x-path database 120 to indicate that the x-path is not functional). Furthermore, in the example embodiment, if there is more than one x-path in x-path database 119 that is associated with the first product page, web crawler 112 may then attempt to access the first product page utilizing the other x-paths associated with the first product page (in a similar manner as described above), until a functional x-path has been identified or until all the x-paths have been tested. If at least one of the one or more x-paths can be utilized to access the first product page, web crawler 112 determines that the x-path(s) associated with the first product page is functional. If at least one of the one or more x-paths are not able to be utilized to access the first product page, web crawler 112 determines that the x-path(s) associated with the first product page is not functional.

If web crawler 112 determines that the x-path(s) associated with the first product page is not functional (decision 212, "NO" branch), web crawler 112 determines if an x-path(s) associated with another product page is functional (decision 214). As stated above, the product listing page may include a listing of multiple products with each product having a corresponding page. Therefore, in the example embodiment, web crawler 112 may determines if an x-path(s) associated with another product page is functional in the same manner as described above (in the discussion of the first product page). Furthermore, in the example embodiment, each of the product pages may be associated with one or more x-paths, and, therefore each of the one or more x-paths may be utilized to attempt to access the corresponding product page in order to determine whether or not the x-path is functional.

If web crawler 112 determines that the x-path(s) associated with the other product pages are not functional (decision 214, "NO" branch), web crawler 112 performs normal web crawling procedures (step 208).

If web crawler 112 determines that the x-path(s) associated with the first product page is functional (decision 212, "YES" branch) or if web crawler 112 determines that the x-path(s) associated with another product page is functional (decision 214, "YES" branch), web crawler 112 utilizes the x-path to access the corresponding product page, i.e., the first product page (step 216).

Web crawler 112 determines if an x-path(s) associated with (accessing) an "add to cart" element is functional (decision 302). In the example embodiment, one or more x-paths may be associated with accessing the "add to cart" element. Therefore, in the example embodiment, web crawler 112 may attempt to utilize a first x-path (obtained from x-path database 119) of the one or more x-paths associated with the "add to cart" element to access the "add to cart" element, and if the "add to cart element" is not successfully accessed, web crawler 112 determines the first x-path is not functional (web crawler 112 may then update x-path database 120 to indicate that the first x-path is not functional). Furthermore, in the example embodiment, if there is more than one x-path in x-path database 119 that is associated with the "add to cart" element, web crawler 112 may then attempt to access the "add to cart" element by utilizing the other x-paths associated with the "add to cart" element (in a similar manner as described above), until a functional x-path has been identified or until all the x-paths have been tested. If at least one of the one or more x-paths can be utilized to access the "add to cart" element, web crawler 112 determines that the x-path(s) associated with the "add to cart" element is functional. If at least one of the one or more x-paths are not able to be utilized to access the "add to cart" element, web crawler 112 determines that the x-path(s) associated with the "add to cart" element is not functional.

In the example embodiment, the "add to cart" element may refer to a user interface element on a product page that may be utilized to add a product to a digital shopping cart. For example, a product page corresponding to a first product may include an "add to cart" user interface element that, if selected, adds the first product to a digital shopping cart. Therefore, web crawler 112 may utilize the x-path(s) associated with the "add to cart" element to attempt to access the "add to cart" element on a product page in order to add a product to a digital shopping cart.

If web crawler 112 determines that the x-path(s) associated with "add to cart" element is not functional (decision 302, "NO" branch), web crawler 112 performs normal web crawling procedures (step 306—same as step 208). In the example embodiment, normal web crawling procedures may include indexing, and validation of interface elements on pages that are accessible to web crawler 112.

If web crawler 112 determines that the x-path(s) associated with the "add to cart" element is functional (decision 302, "YES" branch), web crawler 112 utilizes the x-path to access the "add to cart" element (step 304), which may result in the adding of a product to a digital shopping cart. In the example embodiment, the term "a product", as used herein, may refer to a product (such as a bar of soap, detergent, tickets to an event, etc.), and/or a service (such as subscription).

Web crawler 112 determines if an x-path(s) associated with (accessing) a digital shopping cart page is functional (decision 308). In the example embodiment, one or more x-paths may be associated with accessing the digital shopping cart page. Therefore, in the example embodiment, web crawler 112 may attempt to utilize a first x-path (obtained from x-path database 119) of the one or more x-paths associated with the digital shopping cart page to access the digital shopping cart page, and if the digital shopping cart page is not successfully accessed, web crawler 112 determines the first x-path is not functional (web crawler 112 may then update x-path database 120 to indicate that the first x-path is not functional). Furthermore, in the example embodiment, if there is more than one x-path in x-path database 119 that is associated with the digital shopping cart page, web crawler 112 may then attempt to access the digital shopping cart page by utilizing the other x-paths associated with the digital shopping cart page (in a similar manner as described above), until a functional x-path has been identified or until all the x-paths have been tested. If at least one of the one or more x-paths can be utilized to access the digital shopping cart page, web crawler 112 determines that the x-path(s) associated with the digital shopping cart page, is functional. If at least one of the one or more x-paths are not able to be utilized to access the digital shopping cart page, web crawler 112 determines that the x-path(s) associated with the digital shopping cart page is not functional.

If web crawler 112 determines that the x-path(s) associated with digital shopping cart page is not functional (decision 308, "NO" branch), web crawler 112 performs normal web crawling procedures (step 306—same as step 208). In the example embodiment, normal web crawling procedures may include indexing, and validation of interface elements on pages that are accessible to web crawler 112.

If web crawler 112 determines that the x-path(s) associated with the digital shopping cart page is functional (decision 308, "YES" branch), web crawler 112 utilizes the x-path to access the digital shopping cart page (step 310).

Web crawler 112 determines if an x-path(s) associated with (accessing) a checkout page is functional (decision 312). In the example embodiment, one or more x-paths may be associated with accessing the checkout page. Therefore, in the example embodiment, web crawler 112 may attempt to utilize a first x-path (obtained from x-path database 119) of the one or more x-paths associated with the checkout page to access the checkout page, and if the checkout page is not successfully accessed, web crawler 112 determines the first x-path is not functional (web crawler 112 may then update x-path database 120 to indicate that the first x-path is not functional). Furthermore, in the example embodiment, if there is more than one x-path in x-path database 119 that is associated with the checkout page, web crawler 112 may then attempt to access the checkout page by utilizing the other x-paths associated with the checkout page (in a similar manner as described above), until a functional x-path has been identified or until all the x-paths have been tested. If at least one of the one or more x-paths can be utilized to access the checkout page, web crawler 112 determines that the x-path(s) associated with the checkout page is functional. If at least one of the one or more x-paths are not able to be utilized to access the checkout page, web crawler 112 determines that the x-path(s) associated with the checkout page is not functional.

If web crawler 112 determines that the x-path(s) associated with the checkout page is not functional (decision 312, "NO" branch), web crawler 112 performs normal web crawling procedures (step 306—same as step 208). In the example embodiment, normal web crawling procedures may include indexing, and validation of interface elements on pages that are accessible to web crawler 112.

If web crawler 112 determines that the x-path(s) associated with the checkout page is functional (decision 312, "YES" branch), web crawler 112 utilizes the x-path to access the checkout page (step 314).

Web crawler 112 identifies one or more elements on the checkout page (step 402). In the example embodiment, web crawler 112 may identify one or more elements that correspond to a specific entity, such as a banner advertisement for a specific company. In other embodiments, web crawler 112 may identify one or more elements that correspond to more than one entity. In the example embodiment, web crawler 112 may reference element database 118 to identify one or more elements types that correspond to the website being analyzed, such as website 122. Web crawler 112 may then utilize the information in element database 118 to identify if any of the one or more element types that correspond to the website are present on the checkout page. In the example embodiment, web crawler 112 may search (within the HTML code) for an element type such as links and/or images on the checkout page. For example, web crawler 112 may search for keywords that correspond to the element type (such as keywords that correspond to a banner ad). Further, in these one or more embodiments, web crawler 112 may search for keywords, such as an entity name, within HTML code that corresponds to the links and/or images in order to determine if the links and/or images correspond to an entity or one or more entities. In one or more embodiments, rather than searching for keywords corresponding to identified element types, web crawler 112 may search for keywords corresponding to an entity (or more than one entity) in order to identify the one or more element on the checkout page. In an additional example, web crawler 112 may also search for keywords that correspond to previously used banner ads (outdated banner ads). In other words, if an entity name has changed, web crawler 112 may search for banner ads that include the entity name and also the previously used entity name.

Web crawler 112 may determine if the one or more elements identified on the checkout page are valid (decision 404). In the example embodiment, web crawler 112 may determine if the identified one or more elements are valid by comparing the identified one or more elements to a list of valid element contained in element database 118. In the example embodiment, element database 118 may include a list of valid elements that correspond to each entity (or set of entities). For example, element database 118 may include a list of valid banner advertisements that correspond to a first entity. In this example, element database 118 may compare the identified one or more elements (which may be banner advertisements corresponding to the first entity) to the list of valid banner advertisements that correspond to the first entity in order to determine if the identified one or more elements are valid. Furthermore, in the example embodiment, web crawler 112 may identify the element type (banner advertisement, etc.) corresponding to each of the one or more elements and compare to the valid elements in element database 118 that also correspond to that element type (i.e., compare banner advertisements to banner advertisements).

If web crawler 112 determines that the one or more elements identified on the checkout page are valid (decision 404, "YES" branch), web crawler 112 continues to perform web crawling functions for other webpages or another website. Furthermore, web crawler 112 may update element database 118 to indicate that the one or more elements are valid. If web crawler 112 determines that at least one element of the one or more elements identified on the checkout page are not valid (decision 404, "NO" branch), web crawler 112 updates element database 118 to indicate that the at least one element is not valid (step 406). In the example embodiment, if an entry does not exist for the at least one element, an entry is created in element database 118 in association with the corresponding website (and entity), and further an indication is denote that the element is not valid. This indication may bring the element to the attention of an administrator who may work to update the element to make it valid (or remove the element from the website). For example, if an element (associated with a first entity) present on a first website (owned by a second entity) is determined to be invalid by web crawler 112, web crawler 112 may update element database 118 to indicate that the element located on the first website and associated with a first entity is not valid, and therefore, needs attention. Furthermore, if at least one element of the one or more elements is determined to be valid, web crawler 112 may update element database 118 to indicate that the at least one element is valid.

While, not mentioned in the discussion of FIGS. 2, 3, and 4, while accessing the product listing page, product pages, and other pages of a website, such as website 122 or website 142, web crawler 112 may perform validation techniques to determine if one or more elements corresponding to the accessed pages are valid (in a similar manner as described above). Web crawler 112 may further update element database 118 in correspondence to the associated website (and entity) based on the validation determinations.

Furthermore, although in the example embodiment, web crawler 112 accesses x-path database 119 and determines the one or more x-paths that correspond to the identified platform prior to utilizing them, in other embodiments, web crawler 112 may access x-path database 119 and determine each x-path type as needed. For example, web crawler 112 may access x-path database 119 to determine an x-path(s) associated with accessing the product listing page, and after accessing the product listing page, may determine the x-path associated with accessing a first product page, and continue until reaching the checkout page as described above.

Furthermore, in the example embodiment, the multiple x-paths for each page (the product listing page, each product page, etc.) may be determined by an administrator or may be determined automatically by web crawler 112. For example, web crawler 112 may automatically identify variations for each x-path type (an x-path that corresponds to a product listing page may be a first type, an x-path that correspond to a product page may a second type) by utilizing machine-learning techniques. For example, an administrator may manually tag one or more x-paths utilized for a collection of websites corresponding to a platform or multiple platforms (for example, tagging the x-path with information describing the corresponding x-path type). Web crawler 112 may then utilize this information in identifying potential variations for each x-path type.

In addition, in the example embodiment, x-path database 119 may additionally include one or more x-paths that corresponds to removal of the product that was added to the digital shopping cart. In a similar manner as described above, web crawler 112 may attempt to utilize each of these one or more x-paths until a functional x-path is identified. Web crawler 112 may utilize the determined functional x-path to remove the product that was added to the digital shopping cart.

Figure 5:
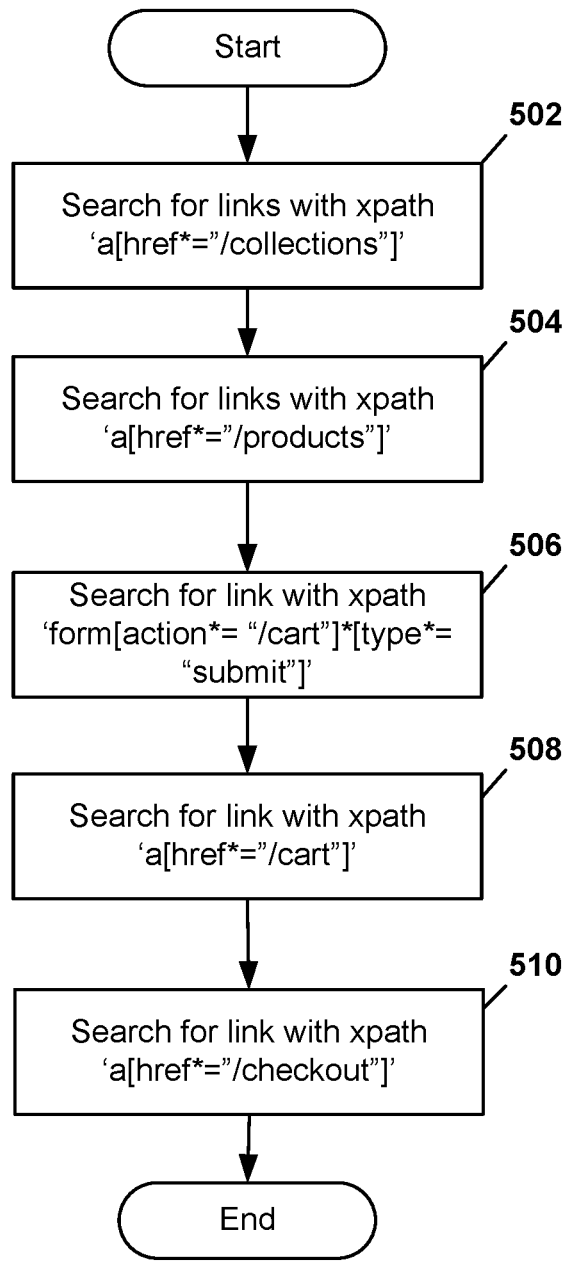
FIG. 5 illustrates a specific example of web crawler 112 identifying multiple x-paths to access a checkout page, in accordance with an embodiment.

FIG. 5 illustrates a specific example of web crawler 112 identifying multiple x-paths to access a checkout page, in accordance with an embodiment. In the example embodiment, web crawler 112 may navigate to a website, and further may reference x-path database 119 to identify one or more x-paths that correspond to the platform associated with the website (the one or more x-paths may include the x-paths searched for below). The x-paths may be utilized to attempt to access the checkout page as described below. In order to navigate to a product listing page of the website, web crawler 112 may search, within the HTML code of the webpage, for links with that have a "/collections" subdomain, or in other words, for links with the xpath: 'a[href*="/collections"]' (step 502). If web crawler 112 is able to identify a link with the xpath: a[href*="/collections"]', web crawler 112 utilizes the link to access the product listing page. Further, in order to navigate to a product page corresponding to a product listed on the product listing page, web crawler 112 may search for links with the xpath: 'a[href*="/products"]' (step 504). If web crawler 112 is able to identify a link with the xpath: 'a[href*="/products"]', web crawler utilizes the link to access the corresponding product page.

In order to access the add to cart element (add the product to a digital cart), web crawler 112 may search for links with the x-path: 'form[action*="/cart"]' *[type*="submit"]' (step 506). If web crawler 112 is able to identify a link with the x-path: 'form[action*="/cart"]' *[type*="submit"]', web crawler utilizes the link to access the add to cart element. In order to access a digital shopping cart page, web crawler 112 may search for links with the x-path: a[ref*="/cart"]' (step 508). If web crawler 112 is able to identify a link with the x-path: a[ref*="/cart"]', web crawler 112 may utilize the link to access the digital shopping cart page.

In order to access the checkout page, web crawler 112 may search for links with the x-path: 'a[ref*="/checkout"]' (step 510). If web crawler 112 is able to identify a link with the x-path: 'a[ref*="/checkout"]', web crawler 112 may utilize the link to access the checkout page. Furthermore, in one or more embodiments, web crawler 112 may search for the x-path: '/cart/change?line=1&quantity=o', in order to empty the digital shopping cart.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 6:
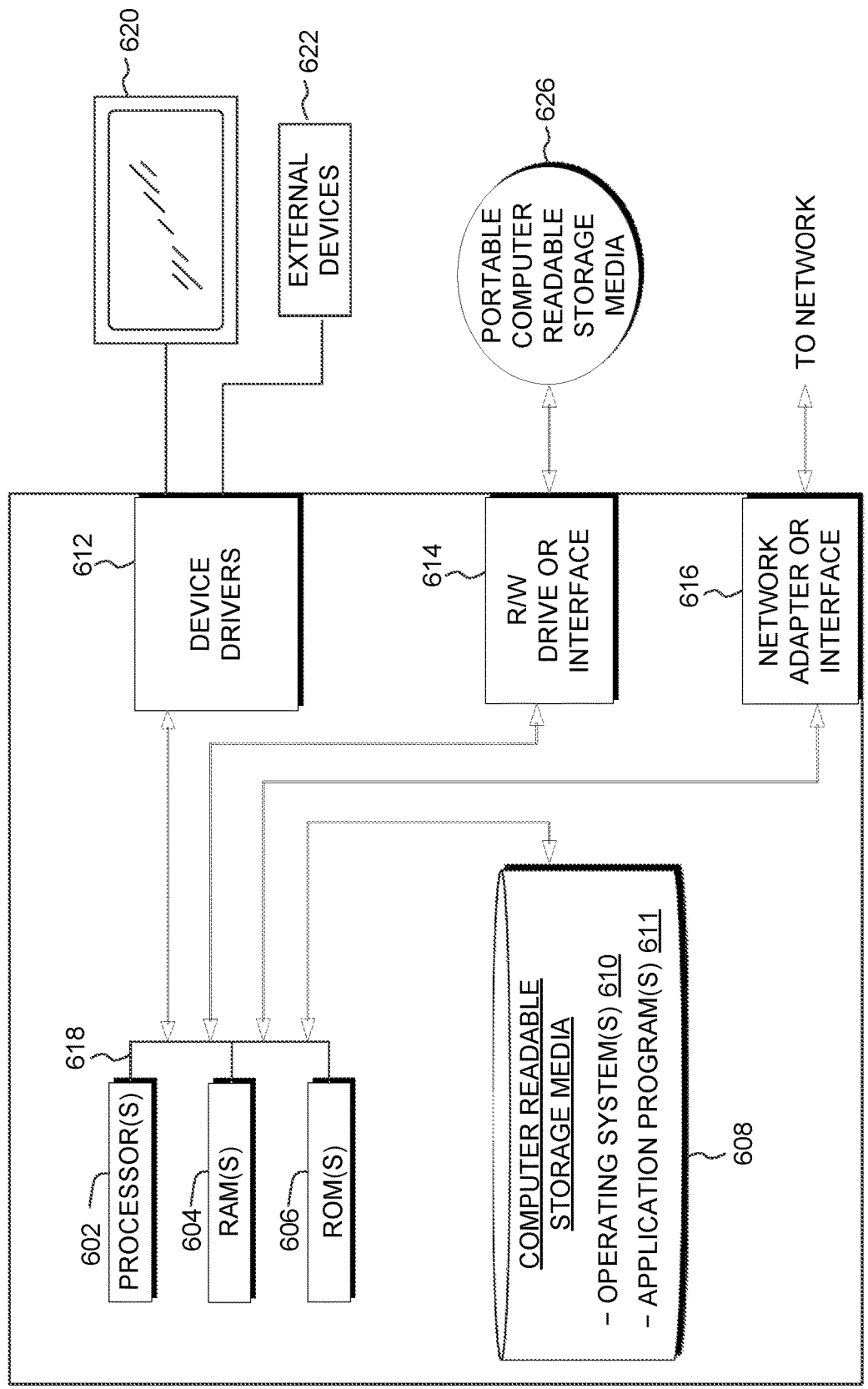
FIG. 6 is a block diagram depicting the hardware components of the web crawler system of FIG. 1, in accordance with an embodiment.

FIG. 6 depicts a block diagram of components of computing devices contained in web crawler system 100 of FIG. 1, in accordance with an embodiment. It should be appreciated that FIG. 6 provides only an illustration of one implementation and does not imply any limitations with regard to the environments in which different embodiments may be implemented. Many modifications to the depicted environment may be made.

Computing devices may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, web crawler 112, are stored on one or more of the computer readable storage media 608 for execution by one or more of the processors 602 and by utilizing one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 614 to read from and write to one or more portable computer readable storage media 626. Application programs 611 on the computing devices may be stored on one or more of the portable computer readable storage media 626, read via the respective R/W drive or interface 614 and loaded into the respective computer readable storage media 608.

Computing devices may also include a network adapter or interface 616, such as a TCP/IP adapter card or wireless communication adapter (such as a 4G wireless communication adapter using OFDMA technology). Application programs 611 on the computing devices may be downloaded to the computing devices from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing devices may also include a display screen 620, and external devices 622, which may include, for example a keyboard, a computer mouse and/or touchpad. Device drivers 612 interface to display screen 620 for imaging, to external devices 622, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
   one or more computer-readable memories storing program instructions; and
   one or more processors configured to execute the program instructions to cause the computer system to perform operations comprising:
   identifying, via a web crawler, a platform that corresponds to a first resource, wherein the platform is usable to create a plurality of different e-commerce websites, wherein the platform is different from the plurality of e-commerce websites, and wherein the first resource includes one or more resource pages;
   accessing, via the web crawler, a database that contains a plurality of associations between a plurality of platforms and a plurality of x-paths, wherein each of the platforms is uniquely associated with a different set of x-paths;
   determining, based on the accessing, a first set of x-paths uniquely associated with the identified platform;
   accessing, via the web crawler and utilizing a first x-path of the first set of x-paths, a product listing page;
   accessing, via the web crawler and utilizing a second x-path of the first set of x-paths, a product page for a product;
   adding, via the web crawler and utilizing a third x-path of the first set of x-paths, the product to a digital shopping cart;
   in response to adding the product to the digital shopping cart associated with the first resource, accessing, via the web crawler and utilizing at least a fourth x-path of the first set of x-paths, accessing first resource page of the one or more resource pages, wherein the first resource page comprises a checkout page; and
   determining whether a first set of one or more elements located within the first resource page is valid.

2. The computer system of claim 1, wherein the operations further comprise:
   in response to determining a first element of the first set of one or more elements located within the first resource page is not valid, updating an element database to indicate that the first element is not valid.

3. The computer system of claim 1, wherein the operations further comprise:
   in response to determining a second element of the first set of one or more elements located within the first resource page is valid, updating an element database to indicate that the second element is valid.

4. The computer system of claim 1, wherein the operations further comprise:
   determining if a second set of one or more elements located on the product listing page is valid;
   updating an element database to indicate that the second set of the one or more elements located on the product listing page is valid or invalid;
   determining if a third set of one or more elements located on the product page is valid; and
   updating the element database to indicate that the third set of the one or more elements located on the product page is valid or invalid.

5. The computer system of claim 1, wherein the operations further comprise:
   attempting to gain access to the first resource page utilizing a fifth x-path of the first set of x-paths; and
   in response to determining that the fifth x-path of the first set of x-paths is not able to be utilized to gain access to the first resource page, updating an x-path database to indicate that the fifth x-path is not functional.

6. The computer system of claim 1, wherein the plurality of x-paths are configured to access different web pages of the e-commerce websites created by the plurality of platforms.

7. The computer system of claim 1, wherein the operations further comprise: utilizing an application programming interface (API) to conduct electronic communications between the web crawler and a web browser and the database.

8. A non-transitory computer-readable medium storing computer-executable instructions, that in response to execution by one or more hardware processors, causes the one or more hardware processors to perform operations comprising:
identifying, via a web crawler, a platform that corresponds to a first resource, wherein the platform is usable to create a plurality of different e-commerce websites, wherein the platform is different from the plurality of e-commerce websites, and wherein the first resource includes one or more resource pages;
accessing, via the web crawler, a database that contains a plurality of associations between a plurality of platforms and a plurality of x-paths, wherein each of the platforms is uniquely associated with a different set of x-paths;
determining, based on the accessing, a first set of x-paths uniquely associated with the identified platform;
utilizing a web crawler and a first subset of x-paths of the first set of x-paths to add a product to a digital shopping cart associated with the one or more resource pages, wherein utilizing the web crawler and the first subset of x-paths to add the product to the digital shopping cart associated with the one or more resource pages includes:
utilizing the web crawler and a first x-path of the first subset of x-paths to access a product listing page;
utilizing the web crawler and a second x-path of the first subset of x-paths to access a product page for a product; and
utilizing the web crawler and a third x-path of the first subset of x-paths to add the product to the digital shopping cart;
in response to adding the product to the digital shopping cart associated with the first resource, utilizing the web crawler and a second subset of x-paths of the first set of x-paths to access a first resource page of the one or more resource pages, wherein the first resource page is a checkout page; and
determining whether a first set of one or more elements located within the first resource page is valid.

9. The non-transitory computer-readable medium of claim 8, wherein the operations further comprise:
in response to determining a first element of the first set of one or more elements located within the first resource page is not valid, updating an element database to indicate that the first element is not valid.

10. The non-transitory computer-readable medium of claim 9, wherein the operations further comprise:
in response to determining a second element of the first set of one or more elements located within the first resource page is valid, updating an element database to indicate that the second element is valid.

11. The non-transitory computer-readable medium of claim 8, wherein the utilizing the second subset of x-paths of the first set of x-paths to access the first resource page of the one or more resource pages includes:
utilizing a fourth x-path of the second subset of x-paths to access a digital shopping cart page; and
utilizing a fifth x-path of the second subset of x-paths to access the first resource page.

12. The non-transitory computer-readable medium of claim 11, wherein the utilizing the second subset of x-paths of the first set of x-paths to access the first resource page of the one or more resource pages further includes:
determining if a second set of one or more elements located on the digital shopping cart page is valid; and
determining if a third set of one or more elements located on the product page is valid.

13. The non-transitory computer-readable medium of claim 8, wherein the utilizing the first subset of x-paths to add the product to the digital shopping cart associated with the one or more resource pages includes:
determining if a third set of one or more elements located on the product listing page is valid; and
determining if a fourth set of one or more elements located on the product page are valid.

14. The non-transitory computer-readable medium of claim 8, wherein the utilizing the second subset of x-paths of the first set of x-paths to access the first resource page of the one or more resource pages includes:
utilizing a sixth x-path of the second subset of x-paths to attempt to gain access to the first resource page; and
in response to determining that the sixth x-path of the second subset of x-paths is not able to be utilized to gain access to the first resource page, updating an x-path database to indicate that the sixth x-path is not functional.

15. A method, comprising:
identifying, via a web crawler, a platform that corresponds to a first resource, wherein the platform is usable to create a plurality of different e-commerce websites, wherein the platform is different from the plurality of e-commerce websites, and wherein the first resource includes one or more resource pages;
accessing, via the web crawler, a database that contains a plurality of associations between a plurality of platforms and a plurality of x-paths, wherein each of the platforms is uniquely associated with a different set of x-paths;
determining, based on the accessing, a first set of x-paths uniquely associated with the identified platform;
accessing, via the web crawler and utilizing a first x-path of the first set of x-paths, a product listing page;
accessing, via the web crawler and utilizing a second x-path of the first set of x-paths, a product page for a product;
adding, via the web crawler and utilizing a third x-path of the first set of x-paths, the product to a digital shopping cart;
in response to adding the product to the digital shopping cart associated with the first resource, accessing, via the web crawler and utilizing at least a fourth x-path of the first set of x-paths, accessing a first resource page of the one or more resource pages, wherein the first resource page comprises a checkout page; and
determining whether a first set of one or more elements located within the first resource page is valid.

16. The method of claim 15, further comprising:
in response to determining a first element of the first set of one or more elements located within the first resource page is not valid, updating an element database to indicate that the first element is not valid.

17. The method of claim 16, further comprising:
in response to determining a second element of the first set of one or more elements located within the first resource page is valid, updating an element database to indicate that the second element is valid.

18. The method of claim 15, further comprising:
determining if a second set of one or more elements located on the product listing page is valid;
updating an element database to indicate that the second set of the one or more elements located on the product listing page is valid or invalid;
determining if a third set of one or more elements located on the product page are valid; and
updating the element database to indicate that the third set of the one or more elements located on the product page is valid or invalid.

19. The method of claim 15, further comprising:
gaining access to the first resource page utilizing a fifth x-path of the first set of x-paths; and
in response to determining that the fifth x-path of the first set of x-paths is not able to be utilized to gain access to the first resource page, updating an x-path database to indicate that the fifth x-path is not functional.

20. The method of claim 15, utilizing an application programming interface (API) to conduct electronic communications between the web crawler and a web browser and the database.

\* \* \* \* \*